Nov. 11, 1958     A. H. KINMAN     2,859,515
DISPOSABLE FEEDING IMPLEMENT
Filed March 20, 1956
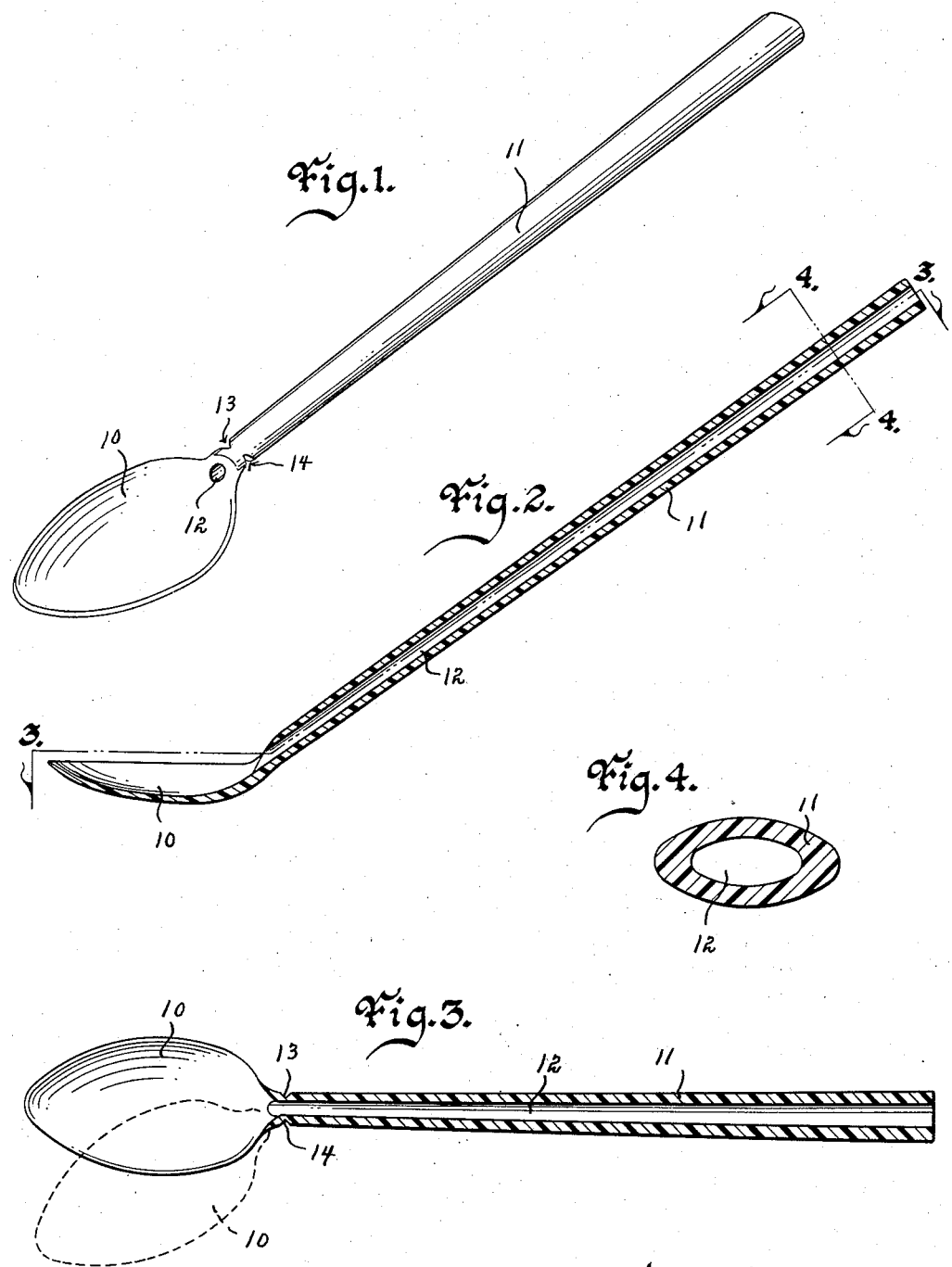

United States Patent Office 2,859,515
Patented Nov. 11, 1958

2,859,515
DISPOSABLE FEEDING IMPLEMENT

Albert Harold Kinman, Guthrie Center, Iowa

Application March 20, 1956, Serial No. 572,755

6 Claims. (Cl. 30—141)

This invention relates to a tool to facilitate eating and more particularly to one that is capable of handling both solid and liquid foods.

Many foods are both at least semisolids and liquids, such as ice cream sodas, malted milks and like. Most people prefer to alternately use a spoon and a straw. However, seldom does a dispenser furnish both spoons and straws. The result is that part of the product is too congealed to suck through a straw. The liquid part on the other hand cannot well be handled by a spoon.

Some effort has been made to combine the spoon and straw, but heretofore such an eating tool has been costly and difficult to maintain in a sanitary condition. Furthermore, the spoon portion obstructs the use of the straw portion when the food contents near the bottom of the dish or container.

Therefore, one of the principal objects of my invention is to provide a cheap disposable eating tool having a spoon portion and a hollow tubular handle portion capable of being used as a straw.

A further object of this invention is to provide an eating tool having a tubular handle portion useable as a straw and a spoon portion that is detachable from said handle portion.

Still further objects of my invention are to provide an eating tool that is economical in manufacture, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my combination eating tool ready for use,

Fig. 2 is a side longitudinal sectional view of the device and more fully illustrates its construction, Fig. 3 is a top plan view of my device with the handle portion shown in section, and Fig. 4 is an enlarged cross sectional view of the handle portion taken on line 4—4 of Fig. 2.

The heart of my invention resides in, first, the making of the item of cheap plastic so that after a single use it is discarded, and, secondly, the detachability of the spoon portion from the handle portion.

In the drawings I have used the numeral 10 to designate the spoon portion. Integrally formed on the rear of the spoon portion 10 is the handle portion 11, oval in cross section, as shown in Fig. 4, for easy grasping by the user. The numeral 12 designates a passageway longitudinally extending completely through the handle 11 and communicating at its forward end with the inside rear of the spoon portion, as shown in Fig. 2. In use, the handle portion is grasped in the usual way and the food may be conveyed to the mouth by either using the spoon portion or sucking the food through the handle portion. Either method may be used intermittently, or if desired the spoon portion may be filled with the liquid food and then transported to the user, by sucking the same from the spoon, through the handle passageway 12 and into the mouth. However, as the liquid food recedes in the cup or like and reaches a plane above the inside bottom of the cup less than the length of the spoon portion, the method of sucking the liquid from the cup through the passageway 12 is impossible. The reason for this is that the spoon portion will prevent the entrance end of the passageway 12 from extending into the extreme bottom area of the cup. In my device, however, this does not present a problem due to the fact that the item is inexpensive and disposable. All that is necessary is to break the spoon portion 10 from the handle portion 11, thus permitting the lowering of the entrance end of passageway completely to the inside bottom of the cup. To facilitate and make possible this breaking of the spoon portion from the handle portion, I have weakened the area where the spoon portion joins the handle portion. This may be accomplished in various ways, i. e., indentations, wells, notches, or the joined area may be reduced in diameter. However, I prefer diametrically opposed notches designated 13 and 14. These two notches are at each side respectively of the lower end of the handle, as shown in Fig. 1. By being located at each side the joined portions are strong at top and bottom so that considerable weight may be placed on the spoon portion without breaking it from the handle. However, whenever it is desired to detach the spoon portion from the handle portion it is merely necessary to pull the spoon portion laterally of the handle as shown by broken lines in Fig. 3, and it will readily break and snap off the handle portion. With the spoon portion removed, the handle portion is used in the same manner as that of a straw with its entrance end adjacent the inside bottom of the material holding cup.

Some changes may be made in the construction and arrangement of my feeding implement without departing from the real spirit and purpose of my invention, and it is my intention to cover by my claims, any modified forms of structure or use of mechanical equivalents which may be reasonably included within their scope.

I claim:

1. In a disposable eating tool, a handle portion having a longitudinal passageway, a spoon portion secured to said handle portion, said handle portion having a point along its length of weaker construction than the balance of said handle portion.

2. In a disposable eating tool, a handle portion having longitudinal passageway, a spoon portion formed on one end of said handle portion, and a notch in said handle portion to define a breaking point thereon, said breaking point being the weakest structural section in said handle portion.

3. In a disposable eating tool, a handle portion having a longitudinal passageway, a spoon portion formed on one end of said handle portion, and two diametrically opposed notches in said handle portion to define a breaking point thereon, said breaking point being the weakest structural section in said handle portion.

4. In a disposable eating tool, a handle portion having a longitudinal passageway, a spoon portion formed on one end of said handle portion, a breaking point indentation on said handle, said breaking point being at the weakest structural section in said handle portion.

5. In a disposable eating tool, a handle portion having a longitudinal passageway, a spoon portion formed on one end of said handle portion, said spoon portion forming a slight angle with said handle portion, and a notch in said handle adjacent said spoon portion to define a breaking point thereon.

6. In a disposable eating tool, a handle portion having a longitudinal passageway, a spoon portion formed on one end of said handle portion, said spoon portion forming a slight angle with said handle portion, and a notch in said handle adjacent said spoon portion to define a breaking point thereon; said breaking point being at the weakest structural section in said handle portion.

References Cited in the file of this patent

UNITED STATES PATENTS

| | | |
|---|---|---|
| 674,446 | Marx | May 21, 1901 |
| 1,329,172 | Gluck | Jan. 27, 1920 |
| 1,606,038 | Norman | Nov. 9, 1926 |
| 1,889,111 | Serr | Nov. 29, 1932 |
| 2,334,535 | Bandell | Nov. 16, 1943 |
| 2,762,501 | Cameron | Sept. 11, 1956 |